United States Patent Office 2,784,230
Patented Mar. 5, 1957

2,784,230
PREPARING 5-TERT-BUTYL-M-XYLYLENE DIAMINE

Louis L. Ferstandig, El Cerrito, Calif., assignor to California Research Corporation, San Francisco, Calif., a corporation of Delaware No Drawing. Application July 17, 1953, Serial No. 368,819

2 Claims. (Cl. 260—570.9)

This invention relates to a new and superior xylylene diamine, namely, 5-t-butyl-m-xylylene diamine.

Xylylene diamines are valuable as reactants in the production of synthetic polyamide resins and also as intermediates for important chemicals such as diisocyanates, which are in great demand in the synthetic polyester rubber field. In the production of synthetic polyamide resins it is important that the xylylene diamine be capable of providing a product having physical characteristics such as ready dyeability, moisture retentivity and high flexibility and impact strengths. In the case of intermediates for diisocyanates used in the preparation of synthetic polyester rubbers, it is desirable that the xylylene diamine have a molecular structure capable of imparting properties such as elasticity to the final product. Above all these, however, it is essential that xylylene diamine be one which can be prepared in high yields without the loss of reactants to the formation of undesirable by-products.

I have now discovered 5-t-butyl-m-xylylene diamine, a novel xylylene diamine obtainable in excellent yields, which forms synthetic polyamide resins of unusual qualities and, in addition, is useful in the preparation of a valuable diisocyanate for the production of improved synthetic polyester rubbers.

The new and superior xylylene diamine of my invention has the following structural formula:

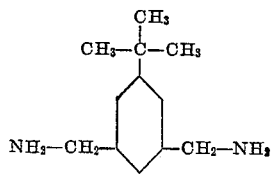

Although it has been termed "5-t-butyl-m-xylylene diamine" for convenient reference in the present invention, it may also be described as "1,3-diaminomethyl-5-t-butyl benzene" or "5-t-butyl-1,3-xylylene diamine," or any other name consistent with the established rules of chemical nomenclature.

The 5-t-butyl-m-xylylene diamine of the invention is unique due to the presence of the bulky symmetrically positioned tertiary butyl group. This particular side group makes it desirable for the production of synthetic polyamide resins having improved dyeability, moisture retentivity and flexural and impact strengths. The present compound is further distinguished in that it may be reacted with any aliphatic dicarboxylic acid of 6 to 10 carbon atoms to give a clear and transparent polyamide resin highly suitable for molding, etc., whereas ordinary m-xylylene diamine yields unsuitable opaque resins with the acids of an even number of carbon atoms. The bulky side group in the 5-t-butyl-m-xylylene diamine also makes it an important intermediate for the preparation of a novel diisocyanate useful in the production of superior synthetic polyester rubber materials. Such materials possess greatly improved elasticity over similar materials prepared from conventional diisocyanates.

The most important advantage, however, of the 5-t-butyl-m-xylylene diamine which may be attributed to its novel structure lies in the fact that unlike other xylylene diamines it can be prepared in high yields without the loss of reactants to the formation of by-products. Ordinarily in the preparation of amines by the reduction of nitriles the imine intermediate tends to react with amine product to form undesirable secondary amines as by-products (U. S. Patent 2,166,183). In the preparation of aromatic amines, such as the xylylene diamines, this side reaction is particularly bothersome and results in greatly decreased yields. In the case of the 5-t-butyl-m-xylylene diamine of the present invention, however, the tertiary butyl group effectively hinders the bimolecular reaction between the imine intermediate and the amine product so that it is produced in high yields without the loss of reactants and the formation of contaminating by-products.

The 5-t-butyl-m-xylylene diamine of my invention is conveniently prepared by the reduction of 5-t-butyl-isophthalonitrile. Hydrogenation of the 5-t-butyl-isophthalonitrile in the presnce of catalysts, such as nickel and cobalt, referred to in U. S. Patents Nos. 2,166,152, 2,166,183 and 2,284,525, is suitably carried out at temperatures in the range of 50–150° C. Pressures of 1000 to 300 p. s. i. g. may be employed.

In further illustration of the 5-t-butyl-m-xylylene diamine of the invention, the following example is submitted. Unless otherwise specified, the proportions given are on a weight basis.

Example 18.4 g. of 5-t-butyl-isophthalonitrile were dissolved in 175 g. of acetic acid and 10 g. of concentrated sulfuric acid were added. 1 g. of 5% palladium on charcoal was then added, following which the mixture was shaken in a bomb under a pressure of 1300 pounds of hydrogen. Heat was then applied to the bomb and in 0.6 hour, just as the temperature reached 75° C., the theoretical amount of hydrogen was absorbed. The bomb was cooled and the contents filtered free of catalyst. The sulfate salt of the 5-t-butyl-m-xylylene diamine in the clear filtrate was precipitated by the addition of 3 volumes of isopropyl alcohol. The precipitated salt in the form of a white crystalline solid was then filtered off and dried, yielding 27 g. or 93% of the theoretical amount.

The sulfate salt of 5-t-butyl-m-xylylene diamine obtained above was dissolved in 90 ml. of water and heated to boiling. 29.4 g. of barium hydroxide octahydrate were then added with stirring. The barium sulfate thus precipitated was digested in the mixture for one-half hour at 90° C. The precipitate was then filtered off, yielding a clear aqueous solution of 5-t-butyl-m-xylylene diamine. Most of the water from this solution was removed by distillation at atmospheric pressure and the remaining solvent was removed by vacuum distillation. The residue was then distilled at 1 mm. of mercury pressure to yield 15.9 g. of pure 5-t-butyl-m-xylylene diamine. Less than 0.2 g. of bottoms remained in the pot.

The pure 5-t-butyl-m-xylylene diamine obtained above represented an 92% yield based on the crude 5-t-butyl-isophthalonitrile charged. Less than 1% of secondary amine was formed, as evidenced by the small amount of bottoms.

The 5-t-butyl-m-xylylene diamine had a melting point of 28.0° C. and boiled at 134° C. under 1 mm. of mercury pressure. It had the following chemical analysis:

|   | Calculated | Found | |
|---|---|---|---|
| C | 74.95 | 74.92 | 75.00 |
| H | 10.48 | 10.40 | 10.46 |
| N | 14.59 | 14.39 | 14.43 |

For the purpose of comparison, meta-xylylene diamine and para-xylylene diamine were prepared from isophthalonitrile and terephthalonitrile, respectively. The method of preparation was identical with that employed above. The yield of meta-xylylene diamine was only 71% and that of para-xylylene diamine only 73% based on the crude dinitriles.

1 claim:

1. Process of preparing 5-tertiarybutyl-m-xylylene diamine in high yields which comprises hydrogenating 5-tertiarybutyl-isophthalonitrile in the presence of a hydrogenation catalyst selected from the group consisting of palladium, cobalt and nickel at a temperature within about the range of 50 to 150° C. and under a pressure within about the range of 1000 to 3000 p. s. i. g., and recovering the 5-tertiarybutyl-m-xylylene diamine.

2. Process of preparing 5-tertiarybutyl m-xylylene diamine in high yields which comprises subjecting 5-tertiarybutyl isophthalonitrile in the presence of a solvent, sulfuric acid and a hydrogenation catalyst selected from the group consisting of palladium, cobalt and nickel to a temperature within about the range of 50 to 150° C. and at a pressure within about the range of 1000 to 3000 p. s. i. g., thereby obtaining a liquid phase comprising the sulfate salt of 5-tertiarybutyl m-xylylene diamine, precipitating said salt from said liquid phase by addition of alcohol thereto, treating said sulfate salt with a base to produce 5-tertiarybutyl m-xylylene diamine and a sulfate salt of said base, and recovering said 5-tertiarybutyl m-xylylene diamine.

References Cited in the file of this patent

UNITED STATES PATENTS

| | | |
|---|---|---|
| 1,873,402 | Herzberg et al. | Aug. 23, 1932 |
| 2,640,080 | De Tar et al. | May 26, 1953 |

OTHER REFERENCES

Beilstein's "Handbuch der org. Chemie" (1930), Vierte Auflage, vol. 13, pp. 191, 193.